Oct. 25, 1932.　　　A. W. MALONE　　　1,884,036
CUSHIONED CABLE SUPPORT
Filed Nov. 14, 1931
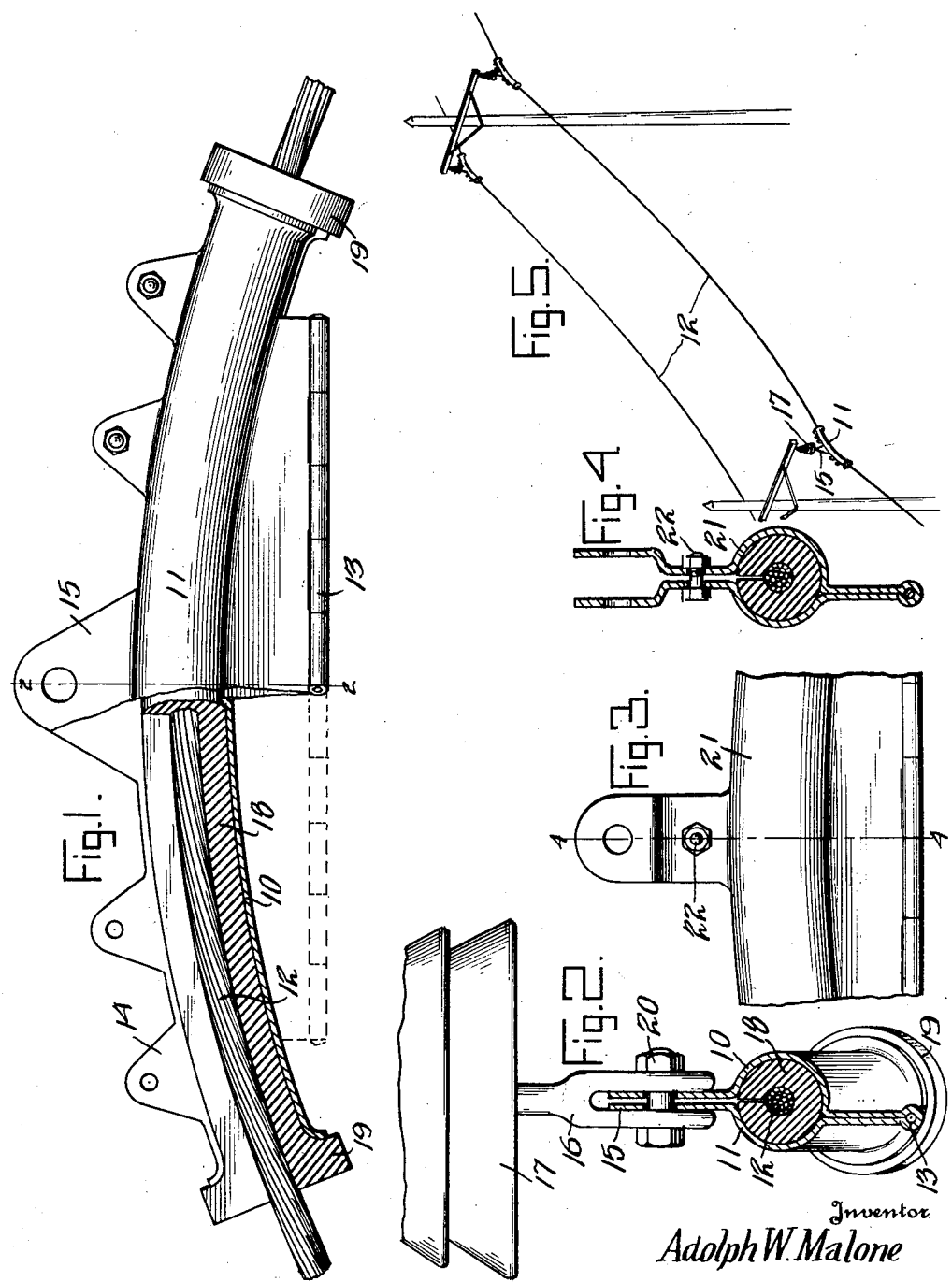
Inventor
Adolph W. Malone Patented Oct. 25, 1932

1,884,036

UNITED STATES PATENT OFFICE

ADOLPH W. MALONE, OF FILLMORE, UTAH, ASSIGNOR OF ONE-HALF TO ALBERT H. VESTAL, OF ANDERSON, INDIANA

CUSHIONED CABLE SUPPORT

Application filed November 14, 1931. Serial No. 575,127.

This invention relates to cable supports and it is an object thereof to provide a resilient support for electric cables.

A further object is to provide means associated with the support which will prevent crystallization and distortion of the cable due to swaying and vibration.

Further objects and advantages will become apparent as the description proceeds.

Referring to the accompanying drawing which is made a part hereof and on which similar reference characters indicate similar parts, Figure 1 is a view in elevation with parts shown in longitudinal section, Figure 2, a section taken on line 2—2 of Figure 1 showing also a portion of an insulator, Figure 3, a side view of a modified form of cable suspension, Figure 4, a section on line 4—4 of Figure 3, and Figure 5, a perspective view showing the device in use.

Some difficulties have been encountered in the suspension of high tension electric cables from their supports in that the swaying of the heavy cables tended to distort and crystallize the metal of the cable at the point of contact with the support. This continued crystallization in time resulted in breaking of the cable with the consequent danger to animals or persons who might contact with such a cable and also causing great expense in repairing the cables.

My invention provides a resilient support for the cables so that the swaying or vibration will be cushioned and any undue friction or vibration eliminated with the consequent elimination of the danger of breaking the cable.

In the drawing 10 and 11 indicate sections of a supporting bracket for an electric cable 12. The sections 10 and 11 are hinged by a longitudinal hinge 13. The sections on their upper sides are provided with perforated lugs 14 by means of which they are secured together. Intermediate the ends of the sections is a relatively long perforated lug 15 by means of which the sections are attached to a supporting link 16 secured in an insulator 17. The hinge 13 is preferably positioned to one side of a vertical line through the axis. This permits a firm bell mouth directly under the cable in order to give a maximum bearing value.

A sleeve 18 of cushioning material is positioned about the cable and is held by the sections 10 and 11. This cushioning material may be of any suitable composition, such for example, as a rubber tube. This tube has flared ends 19 which extend around the edge of the metal casing 10 and 11 and prevent contact of the cable with the metal. The rubber cushions the cable against any jarring contact with the ends of the supporting bracket. The bracket moreover is pivoted to the link 16 by a bolt or pin 20 so as to permit any necessary rocking motion due to swaying of the cables. This motion of course can only be in a vertical plane. Any other swaying of the cable which would tend to fray the cable against the ends of the brackets will be absorbed by the resilient cushion 18. In the form shown in Figures 3 and 4 the bracket 21 is similar in all respects to that shown in Figure 1 except the means by which it is secured to the link 16. In this form the bracket is secured together by means of a bolt 22. The lug through which the bolt 22 passes is extended up above and opened to permit a link corresponding to 16 to be inserted between the separate members of the frame.

The operation of the form shown in Figures 3 and 4 is substantially the same as that shown in Figure 1. In any case the swaying or vibration of the cable will not seriously injure it since there is a resilient connection between it and the supporting towers or poles.

It will be obvious to those skilled in the art that various changes may be made in my device without departing from the spirit of the invention and therefore I do not limit myself to what is shown in the drawing and described in the specification, but only as indicated by the appended claims.

Having thus fully described my said invention, what I claim as new and desire to secure by Letters Patent, is:

1. A support for a cable comprising bracket having flared ends, a resilient arcuate cushion having flared ends carried by said bracket, said cushion being split along its upper surface and adapted to support an electric cable, and integral means for suspending the bracket from a fixed support, said means permitting rocking of the bracket in a vertical plane, substantially as set forth.

2. A resilient support for a high tension electric cable comprising a resilient arcuate sleeve fitted about said cable, an arcuate enclosing bracket about said sleeve, and upstanding integral lugs for pivotally mounting the bracket on a fixed support, substantially as set forth.

3. A support for a high tension electric cable comprising an arcuate sleeve of resilient material, a separable casing about said sleeve, coinciding upstanding lugs on each half for pivotally mounting said casing on a fixed support, and a plurality of integral lugs on said casing for securing the separate halves of the casing together, substantially as set forth.

4. A support for an electric cable comprising an arcuate sleeve of compressible material split from end to end on one side adapted to be positioned about the cable, an arcuate casing hinged throughout its length and positioned about said sleeve, said casing elements having a plurality of registering lugs by means of which the elements of the casing are held together, and each a relatively long lug adapted to support said casing from an insulated fixed support, substantially as set forth.

5. A support for a high tension electric cable to eliminate metal fatigue in the cable comprising an arcuate rubber sleeve having flared ends cut along one side to enable it to be positioned about the cable, an arcuate two part casing having a longitudinal hinge and placed about said sleeve, said bracket having a plurality of lugs along one side of each part for securing the elements of the bracket together, and a lug on each part for pivotally mounting the bracket to pivot in a vertical plane, substantially as set forth.

In witness whereof, I have hereunto set my hand and seal at Washington, District of Columbia, this twenty-second day of October, A. D. nineteen hundred and thirty-one.

ADOLPH W. MALONE.